US011761798B2

(12) United States Patent
Watanabe

(10) Patent No.: US 11,761,798 B2
(45) Date of Patent: Sep. 19, 2023

(54) INFORMATION PROCESSING SYSTEM, INFORMATION PROCESSING METHOD, RECORDING MEDIUM, NODE DEVICE, GATEWAY DEVICE, MANUFACTURING SYSTEM, METHOD OF MANUFACTURING PRODUCT

(71) Applicant: CANON KABUSHIKI KAISHA, Tokyo (JP)

(72) Inventor: Kento Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 17/188,024

(22) Filed: Mar. 1, 2021

(65) Prior Publication Data

US 2021/0293585 A1 Sep. 23, 2021

(30) Foreign Application Priority Data

Mar. 23, 2020 (JP) ................................ 2020-050521
Oct. 27, 2020 (JP) ................................ 2020-179431

(51) Int. Cl.
*G01D 5/39* (2006.01)
*G01D 21/00* (2006.01)
*H04L 67/12* (2022.01)
*H04L 67/565* (2022.01)

(52) U.S. Cl.
CPC .............. *G01D 5/39* (2013.01); *G01D 21/00* (2013.01); *H04L 67/12* (2013.01); *H04L 67/565* (2022.05)

(58) Field of Classification Search
None
See application file for complete search history.

(56) References Cited

U.S. PATENT DOCUMENTS

| 2006/0173995 | A1 | 8/2006 | Moriwaki | |
|---|---|---|---|---|
| 2007/0299956 | A1 | 12/2007 | Odaka | |
| 2014/0324615 | A1* | 10/2014 | Kulkarni | G06Q 30/0601 705/26.1 |
| 2016/0039340 | A1* | 2/2016 | Schantz | B60Q 9/008 340/435 |
| 2019/0342454 | A1* | 11/2019 | Sugaya | H04M 7/0021 |

FOREIGN PATENT DOCUMENTS

| JP | 2006-209457 A | 8/2006 |
|---|---|---|
| JP | 2007-156779 A | 6/2007 |
| JP | 2012-238082 A | 12/2012 |
| JP | 2014-71495 A | 4/2014 |
| JP | 2018-56649 A | 4/2018 |

\* cited by examiner

*Primary Examiner* — Thomas S McCormack
(74) *Attorney, Agent, or Firm* — VENABLE LLP

(57) ABSTRACT

An information processing system includes a plurality of node devices and a gateway device configured to communicate with the plurality of node devices. Each of the plurality of node devices is connected to a sensor configured to measure a state of a facility, and is configured to execute a measurement task. Each of the plurality of node devices is configured to add node identification information used to identify the node device and task identification information used to identify the measurement task executed by the node device, to measurement data acquired in the measurement task, and send the measurement data to the gateway device.

29 Claims, 17 Drawing Sheets

FIG.4

NODE NUMBER:104

| TASK NUMBER | EVENT CONDITION | INPUT CONDITION | PROCESSING CONDITION | OUTPUT CONDITION |
|---|---|---|---|---|
| 1 | INTERVALS OF 60 MINITUTES | ch1, 54kHz, 0~5V, NUMBER OF SAMPLES OF 10,000, AMPLIFICATION FACTOR OF 50 | ① FFT PROCESS ② PARTIAL OVERALL PROCESS | WIRELESS COMMUNICATION (GW) |
| 2 | 15:00 ON EVERY MONDAY | ch2, 54kHz, 0~5V, NUMBER OF SAMPLES OF 10,000, AMPLIFICATION FACTOR OF 50 | ① FFT PROCESS | WIRE COMMUNICATION (GW) |
| | | | | |

| NODE NUMBER | TASK NUMBER | DATABASE | RECEIVING MEANS | TABLE |
|---|---|---|---|---|
| 101 | 1 | DB1 | WIRE COMMUNICATION | TBL1 |
| 101 | 2 | DB1 | WIRE COMMUNICATION | TBL2 |
| 101 | 3 | DB2 | WIRE COMMUNICATION | TBL1 |
| 104 | 1 | DB1 | WIRELESS COMMUNICATION | TBL3 |
| 104 | 2 | DB1 | WIRELESS COMMUNICATION | TBL4 |
| | | | | |
| | | | | |

FIG.10

NODE NUMBER:802

| TASK NUMBER | EVENT CONDITION | INPUT CONDITION | PROCESSING CONDITION | OUTPUT CONDITION |
|---|---|---|---|---|
| 1 | INTERVALS OF 60 MINITUTES | ch1, 54kHz, 0~5V, NUMBER OF SAMPLES OF 10,000, AMPLIFICATION FACTOR OF 50 | ① FREQUENCY FILTER PROCESS ② AVERAGE VALUE PROCESS | WIRELESS COMMUNICATION (GW) TASK 2, 3 (>50.0) |
| 2 | CALL | ch1, 54kHz, 0~5V, NUMBER OF SAMPLES OF 10,000, AMPLIFICATION FACTOR OF 50 | ① FFT PROCESS | WIRELESS COMMUNICATION (GW) |
| 3 | CALL | ch2, 54kHz, 0~5V, NUMBER OF SAMPLES OF 10,000, AMPLIFICATION FACTOR OF 1 | ① FREQUENCY FILTER PROCESS ② AVERAGE VALUE PROCESS | WIRELESS COMMUNICATION (GW) |

| TASK NUMBER | EVENT CONDITION | INPUT CONDITION | PROCESSING CONDITION | OUTPUT CONDITION |
|---|---|---|---|---|
| 1 | INTERVALS OF 60 MINUTES | ch1 54kHz 0~5V NUMBER OF SAMPLES OF 10,000, AMPLIFICATION FACTOR OF 50 | ① FREQUENCY FILTER PROCESS ② AVERAGE VALUE PROCESS | WIRELESS COMMUNICATION (GW) NODE 1103. WIRELESS CALL TO TASK 2 (>50.0) |

NODE NUMBER: 1102

FIG.13

NODE NUMBER:1103

| TASK NUMBER | EVENT CONDITION | INPUT CONDITION | PROCESSING CONDITION | OUTPUT CONDITION |
|---|---|---|---|---|
| 1 | 15:00 ON EVERY MONDAY | ch1 54kHz, 0~5V, NUMBER OF SAMPLES OF 10,000, AMPLIFICATION FACTOR OF 1 | ①FREQUENCY FILTER PROCESS ②AVERAGE VALUE PROCESS | WIRELESS COMMUNICATION (GW) |
| 2 | CALLED FROM OTHER NODE | ch1 54kHz, 0~5V, NUMBER OF SAMPLES OF 10,000, AMPLIFICATION FACTOR OF 1 | ①FREQUENCY FILTER PROCESS ②AVERAGE VALUE PROCESS | WIRELESS COMMUNICATION (GW) |
|  |  |  |  |  |

FIG.16

| NODE NUMBER | TASK NUMBER | DATABASE | RECEIVING MEANS | TABLE |
|---|---|---|---|---|
| 1402 | 1 | DB1 | WIRE COMMUNICATION | TBL1 |
| 1402 | 2 | DB1 | WIRE COMMUNICATION | TBL2 |
| 1402 | 3 | DB2 | WIRE COMMUNICATION | TBL1 |
| 1450 | 1 | DB1 | WIRELESS COMMUNICATION | TBL3 |
| 1450 | 2 | DB1 | WIRELESS COMMUNICATION | TBL4 |
| 1403 | 1 | TESTDB | WIRELESS COMMUNICATION | TESTTBL |
|  |  |  |  |  |

1601  1602  1603  1604  1605  1606

INFORMATION PROCESSING SYSTEM, INFORMATION PROCESSING METHOD, RECORDING MEDIUM, NODE DEVICE, GATEWAY DEVICE, MANUFACTURING SYSTEM, METHOD OF MANUFACTURING PRODUCT

BACKGROUND OF THE INVENTION

Field of the Invention

The present invention relates to an information processing system and the like that obtains the state of a production facility by collecting measurement data from sensors attached to the production facility.

Description of the Related Art

In general, it has been difficult to find an abnormal state of a production facility in the maintenance of the production facility even if the production facility is in the abnormal state, as long as the abnormal state does not hinder the operation of the production facility. For this reason, preventive maintenance that needs periodic inspection, repair, and component replacement is performed. However, the preventive maintenance has a problem that involves the regular inspection and its man-hours.

As countermeasures to such a problem, predictive maintenance has been tried in recent years. In the predictive maintenance, sensors are disposed in a production facility, and the component replacement, repair, and update are performed in accordance with the state of the production facility for reducing unnecessary component replacement and labor costs.

In this case, since many sensors are disposed to collect measurement data, detailed diagnosis and early detection of abnormality can be achieved. However, if many sensors are disposed, types of the sensors and types of measurement need to be identified in the collection of measurement data.

For this reason, a diagnosis system that identifies an individual sensor and a type of measurement has already been proposed.

For example, Japanese Patent Application Publication No. 2012-238082 discloses a data collection method. In the data collection method, a data collection device sends ID numbers of measuring devices and the order of collection of measurement data, to all the measuring devices. The measuring devices are devices whose measurement data is required by the data collection device. Each of the measuring devices determines whether the current communication is a communication between the data collection device and a measuring device whose ID number precedes the ID number of the measuring device itself, depending on the order of collection of measurement data; and sends the measurement data to the data collection device at an appropriate timing.

In the conventional method, however, the data collection device has to determine the order of collection in advance for determining the type of measurement data. In addition, the data collection device has to specify measurement conditions, or otherwise the sensors have to send their measurement conditions to the data collection device. In this case, since the measurement-condition data has to be handled in addition to the measurement data, the amount of data will increase, possibly making it difficult for the wireless-communication band to accommodate the measurement-condition data and the measurement data.

Thus, it has been desired to achieve a method that can recognize a measurement condition of a measurement data even in a limited communication band.

SUMMARY OF THE INVENTION

According to a first aspect of the present invention, an information processing system includes a plurality of node devices and a gateway device configured to communicate with the plurality of node devices. Each of the plurality of node devices is connected to a sensor configured to measure a state of a facility, and is configured to execute a measurement task. Each of the plurality of node devices is configured to add node identification information used to identify the node device and task identification information used to identify the measurement task executed by the node device, to measurement data acquired in the measurement task, and send the measurement data to the gateway device.

According to a second aspect of the present invention, an information processing method uses an information processing system. The information processing system includes a plurality of node devices and a gateway device configured to communicate with the plurality of node devices. Each of the plurality of node devices is connected to a sensor configured to measure a state of a facility, and is configured to execute a measurement task. The method includes adding, by each of the plurality of node devices, node identification information used to identify the node device and task identification information used to identify the measurement task executed by the node device, to measurement data acquired in the measurement task, and sending the measurement data to the gateway device.

According to a third aspect of the present invention, a node device is connected to a sensor configured to measure a state of a facility. The node device is configured to execute a measurement task. The node device is configured to communicate with a gateway device. The node device is configured to add node identification information used to identify the node device and task identification information used to identify the measurement task executed by the node device, to measurement data acquired in the measurement task, and send the measurement data to the gateway device.

According to a fourth aspect of the present invention, a gateway device is configured to communicate with a plurality of node devices. Each of the plurality of node devices is connected to a sensor configured to measure a state of a facility, and is configured to execute a measurement task. If the gateway device receives from any one of the plurality of node devices, measurement data to which node identification information used to identify the node device and task identification information have been added, the gateway device stores the measurement data to which the node identification information and the task identification information have been added, in a database of an information processing system.

According to a fifth aspect of the present invention, a manufacturing system includes a facility configured to manufacture a product, a plurality of node devices, each of the plurality of node devices being connected to a sensor configured to measure a state of the facility, and being configured to execute a measurement task, and a gateway device configured to communicate with the plurality of node devices. Each of the plurality of node devices is configured to add node identification information used to identify the node device and task identification information used to identify the measurement task executed by the node device, to measurement data acquired in the measurement task, and send the measurement data to the gateway device.

Further features of the present invention will become apparent from the following description of exemplary embodiments with reference to the attached drawings.

BRIEF DESCRIPTION OF THE DRAWINGS

FIG. 4 is a task table of the node device of the embodiment.

FIG. 10 is a task table of the node device of the second example.

FIG. 13 is a task table of another node device of the third example.

FIG. 16 is an index table of a gateway device of the fourth example.

DESCRIPTION OF THE EMBODIMENTS

Embodiment

Hereinafter, an information processing system (facility monitoring system) of an embodiment of the present invention will be described with reference to the accompanying drawings.

Figure 1:
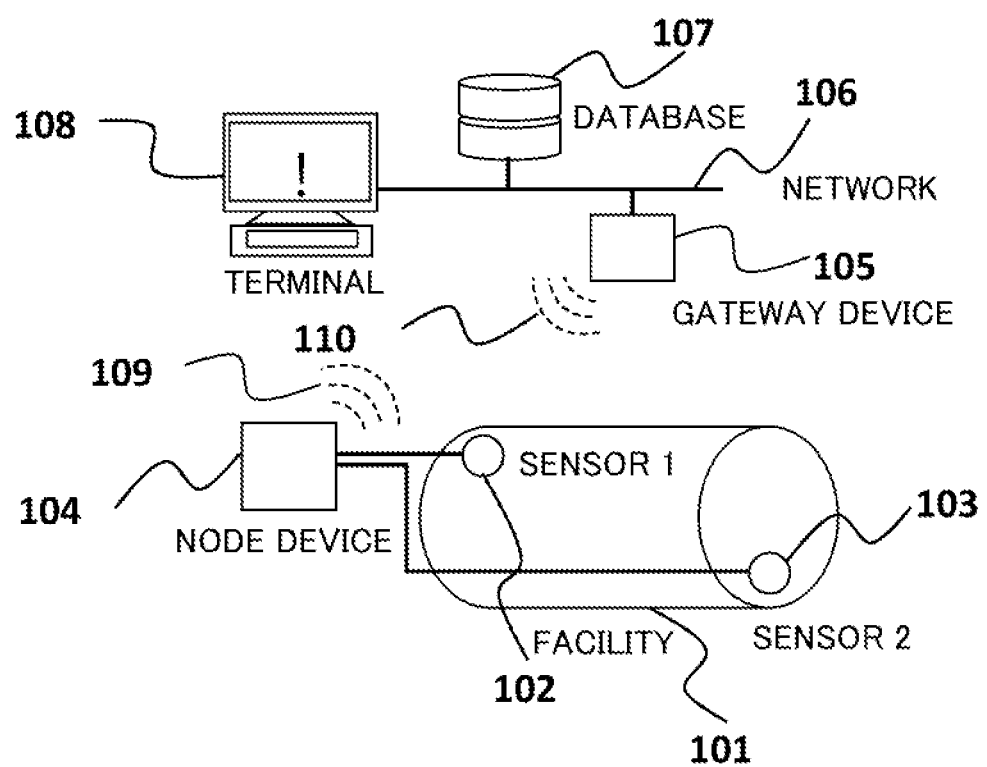
FIG. 1 is a schematic diagram of an information processing system of an embodiment.

FIG. 1 is a schematic diagram of a production facility to which the information processing system of an embodiment has been applied. The production facility 101 includes sensors 102 and 103 used to obtain the state of the production facility 101. Each of the sensors 102 and 103 may be a vibration sensor, an acceleration sensor, a pressure sensor, a photosensor, a torque sensor, or a temperature sensor; and measures the state of the production facility 101 and quantifies the state as a physical quantity. Thus, the information processing system obtains the state of the production facility 101 by using the sensors 102 and 103, and thereby monitors the production facility 101.

For obtaining the state of the production facility 101, a node device 104 is connected with at least one of the sensors 102 and 103. The sensors 102 and 103 may be included in the node device 104. The node device 104 is one or more in number, determined as necessary; and is disposed in the production facility 101. The node device 104 includes communication units 109, which allow the node device 104 to communicate with a gateway device 105. The communication units include one or more communication portions, selected appropriately from wireless communications including low power wide area (LPWA) and wireless LAN, and wire communications including the Ethernet and Field Network.

The measurement data measured by the sensors is collected in the gateway device 105 from the node device 104 via the communication units 109 and 110. The gateway device 105 is connected with an in-plant network 106. Note that the in-plant network 106 may be a dedicated network used in a plant (LAN), or may be a wide area network such as the Internet. The gateway device 105 is installed in an area in which the gateway device 105 can communicate with the node device 104 via the communication units 109 and 110.

The measurement data collected in the gateway device 105 is stored in a database 107 of a data storage device connected to the in-plant network 106. Note that the function of the gateway device 105 may be implemented as software in the database 107 or a storage portion of a computer. In addition, the database 107 may be a storage device or a storage medium.

An administrator can check the resultant data stored in the database 107, by using a computer 108. If an abnormal state occurs in the production facility 101, the computer 108 can notify the administrator of the abnormal state, if necessary. For example, the computer 108 may issue an alert, or send a mail to the administrator.

Figure 2:
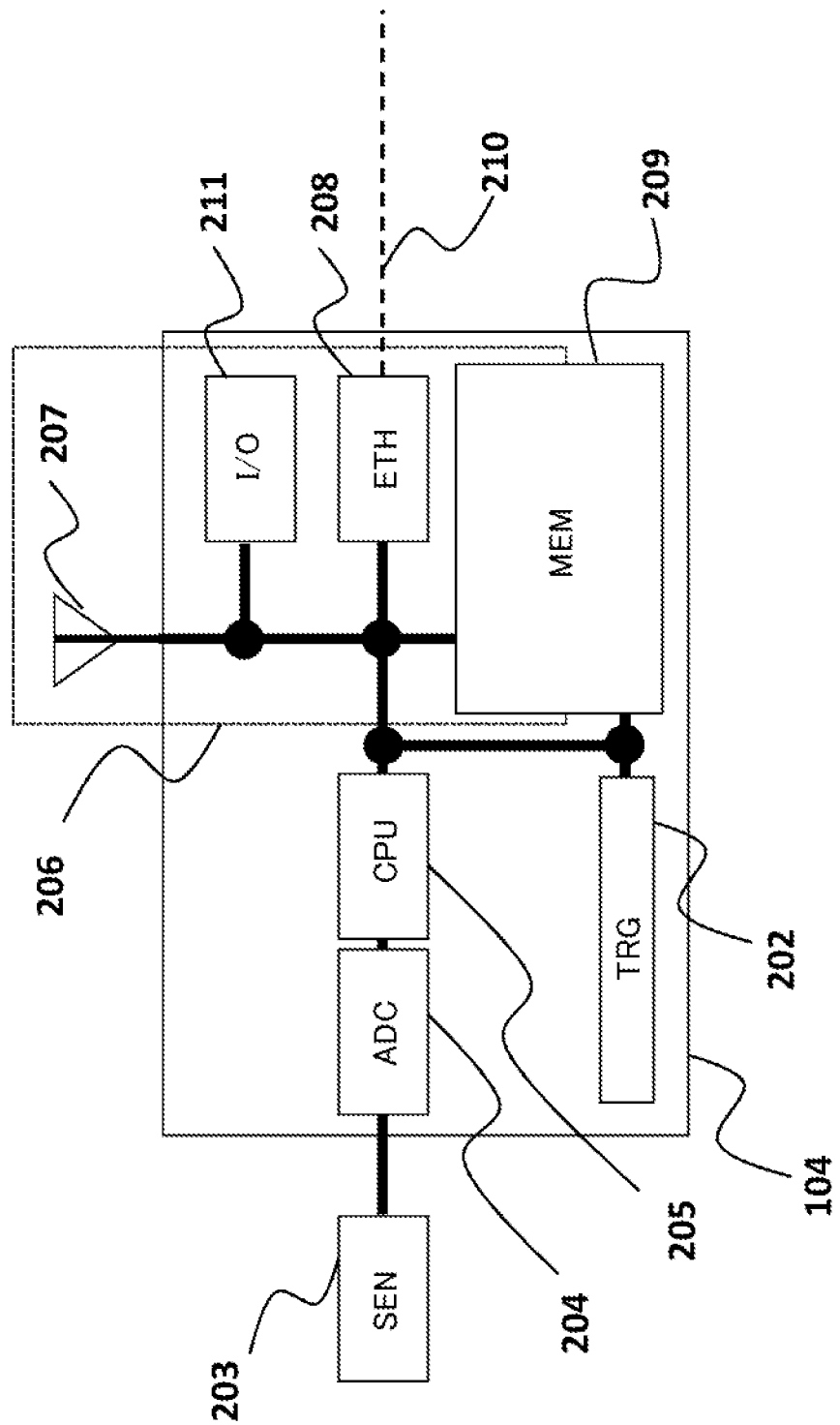
FIG. 2 is a block configuration diagram of a node device of the embodiment.

FIG. 2 is a schematic diagram illustrating a block configuration of the node device 104 of FIG. 1. The node device 104 is connected with a sensor 203 that is one or more sensors disposed in the production facility 101. The node device 104 includes a signal input portion (A/D converter) 204, which converts an analog signal outputted from the sensor 203, to a digital signal. The signal input portion 204 converts one or more analog input signals to digital signals. Note that the signal input portion 204 may be included in the sensor 203, and the sensor 203 may output the digital signals.

The signal digitized by the signal input portion 204 is processed by a CPU 205. The CPU 205 selects one or more of the following processes: no-operation process, FFT process, partial overall process, envelop process, frequency filter process, differential process, integral process, wavelet process, average value process, standard deviation process, maximum value process, minimum value process, peak-to-peak process, peak hold process, effective value process, crest factor process, form factor process, impulse coefficient process, margin coefficient process, and machine-learning-model inference process, determines the order of the selected processes, and executes them.

For example, in the no-operation process, the CPU 205 does not process the digitized input signal, and delivers the digitized signal to an output portion 206. In the FFT process, the CPU 205 decomposes the digitized input signal into frequency components. In the partial overall process, the CPU 205 determines a frequency range, and sums the FFT-processed frequency components in the determined frequency range. In the envelop process, the CPU 205 determines an envelope of the input signal. In the frequency filter process, the CPU 205 sets a frequency range, and causes the input signal to pass through a low-pass filter, a high-pass filter, or a band-pass filter for eliminating undesired signals and obtaining an intended signal.

In the differential process, the CPU 205 differentiates the input signal. In the integral process, the CPU 205 integrates the input signal. In the wavelet process, the CPU 205 decomposes the digitized input signal into frequency components and time components. In the average value process, the CPU 205 calculates an average value of the input signal. In the standard deviation process, the CPU 205 calculates a standard deviation of the input signal. In the maximum value process, the CPU 205 calculates a maximum value of the input signal. In the minimum value process, the CPU 205 calculates a minimum value of the input signal. In the peak-to-peak process, the CPU 205 calculates a difference between the maximum value and the minimum value of the input signal. In the peak hold process, the CPU 205 measures the input signal continuously in a predetermined period of time, and calculates a maximum value of the input signal in the predetermined period of time. In the effective value process, the CPU 205 calculates an effective value of the input signal.

In the crest factor process, the CPU 205 calculates a crest factor of the input signal by dividing a maximum value of the input signal by an effective value of the input signal. In the form factor process, the CPU 205 calculates a form factor of the input signal by dividing an effective value of the input signal by an average value of the input signal. In the impulse coefficient process, the CPU 205 calculates an impulse coefficient of the input signal by dividing a maximum value of the input signal by an absolute average value of the input signal. In the margin coefficient process, the CPU 205 calculates a margin coefficient of the input signal by dividing a maximum value of the input signal by a value of the input signal. The value is obtained by calculating a square root of an average value of the input signal, and then calculating a square of the square root value. In the machine-learning-model inference process, a computer creates a machine learning model (learned model) in advance by reading and analyzing learning data. In the machine learning model, rules for classification and identification are defined. The machine learning model is implemented in the node device 104, and the CPU 205 determines the output depending on the input signal and the machine learning model.

Note that although the above-described various types of signal processing are performed by the CPU 205, they may be performed by a dedicated piece of hardware such as a PLA.

The node device 104 includes the output portion 206 that outputs a signal processed by the CPU 205. The output portion 206 operates under the control of the CPU 205, and includes at least one of a wireless-communication unit 207 and a wire-communication unit 208. In addition to the wireless-communication unit 207 and/or the wire-communication unit 208, the output portion 206 can select at least one of a storage portion 209 and a general-purpose input/output portion 211, and can output measurement data to a selected portion. Specifically, the output portion 206 can add a node number (node identification information) and a measurement task number (task identification information) to measurement data, and output the measurement data. The node number serves as identification information used to identify the node device 104 as an individual device. The output portion 206 uses wireless communications or wire communications, and outputs the node number, the measurement task number, and the measurement data to the gateway device 105 in this order. The wire-communication unit 208 is connected to the gateway device 105 via a sensor network 210.

The node device 104 includes an event generation portion 202 that is activated at diagnosis intervals or a diagnosis time, which is predetermined as a timer trigger, or is activated by a trigger inputted via the general-purpose input/output portion 211. The event condition of the event generation portion 202 includes at least one of a predetermined measurement interval, a time, an external-trigger input signal, a change in the state of the node device, a call from another task of the node device, a call from the gateway device, and a call from another node device. If a plurality of event generation conditions is selected, the measurement is started when any one of the selected conditions is satisfied.

The event generation portion 202 may be a dedicated piece of hardware such as a PLA, or may be a piece of software that is a control program for controlling the operation of the CPU 205.

For example, if the event condition is measurement intervals, events are generated at predetermined intervals. If the event condition is a time, an event is generated, for example, at a predetermined time on a predetermined day of the week. If the event condition is an external-trigger input signal, an event is generated when a signal from the general-purpose input/output portion 211 changes. If the event condition is a change in the state of the node device, an event is generated when the remaining battery level of the node device changes, or when a signal from a temperature sensor of the node device changes. If the event condition is a call from another task of the node device, an event is generated when the event generation portion 202 is called from the other task of the node device under the output condition of the other task. If the event condition is a call from the gateway device, an event is generated when the node device receives a task execution command from the gateway device. If the event condition is a call from another node device, an event is generated when the event generation portion 202 is called from the other node device under the output condition of the other node device.

The event condition of the event generation portion 202, the signal input condition of the signal input portion 204, the signal processing condition of the CPU 205, and the output condition of the output portion 206 are stored, as components of a measurement task, in a task table of the storage portion 209. Note that although the task table is stored in the storage portion 209, the task table may be stored in another storage device.

Figure 3:
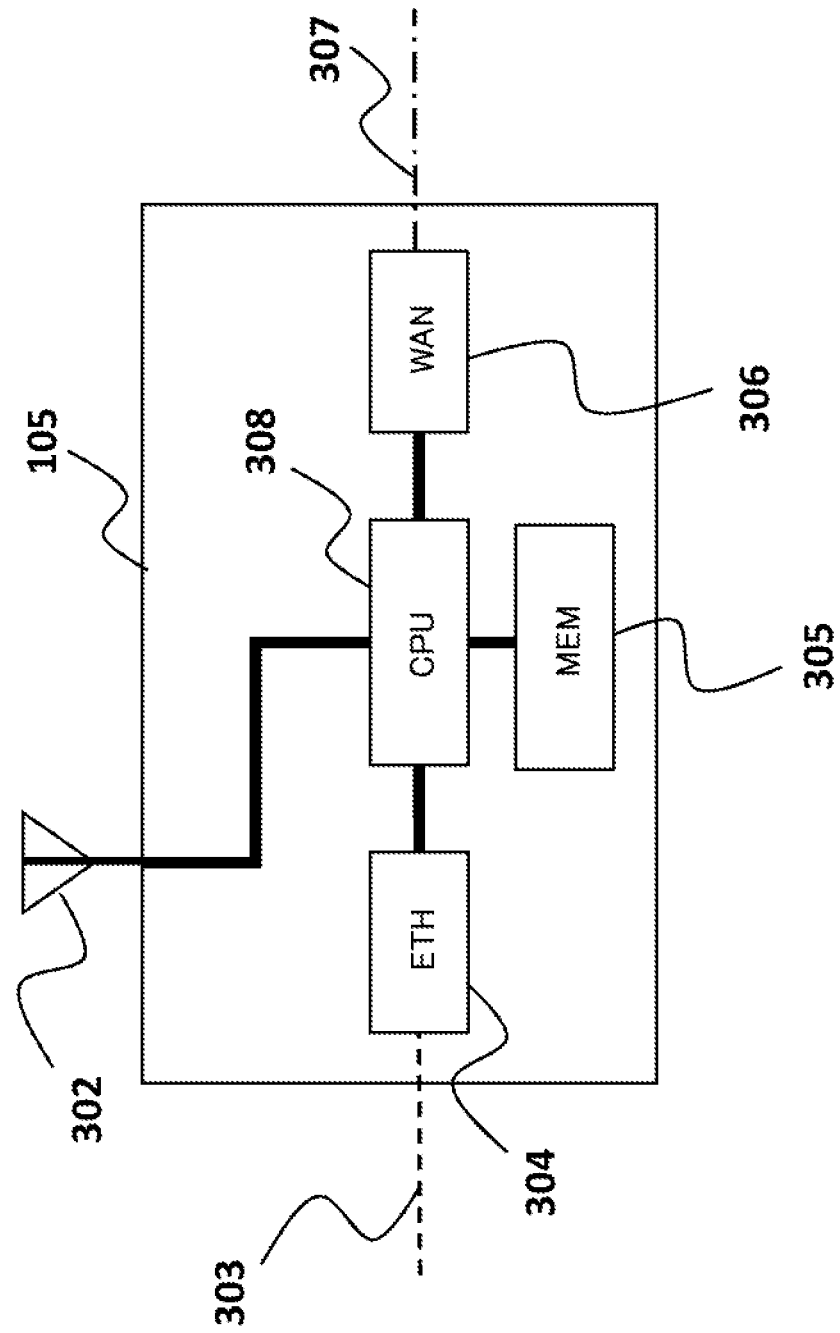
FIG. 3 is a block configuration diagram of a gateway device of the embodiment.

FIG. 3 is a schematic diagram illustrating a block configuration of the gateway device 105 illustrated in FIG. 1. The gateway device 105 includes a wire-communication unit 304 for communicating via wire with the node device 104, via a sensor network 303 (210). In addition, the gateway device 105 includes a wireless-communication unit 302 for communicating wirelessly with the node device 104. The unit that allows the gateway device 105 and the node device 104 to communicate with each other may be the wire-communication unit 304 or the wireless-communication unit 302, depending on an environment where the node device 104 is installed.

The gateway device 105 includes a CPU 308 that controls the operation of each unit. The gateway device 105 has an index table stored in a storage device 305. The index table is used to associate measurement data with a corresponding table of the database 107 (FIG. 1) by using anode number and a task number. The node number is used to identify the node device 104 as an individual device. The CPU 308 of the gateway device 105 determines a table of the database 107 in which the measurement data is to be stored, by using the node number of the node device 104, the measurement task number, and information of the index table. The gateway device 105 receives measurement data from the node device 104 via the wire-communication unit 304 or the wireless-communication unit 302, and stores the measurement data in a table of the database 107 via an in-plant network 307 (106) connected with a wire-communication unit 306. Note that the sensor network 303 and the in-plant network 307 may be an identical network.

The table illustrated in FIG. 4 is a task table 401 of the node device 104. The node device 104 has the task table 401, which is stored in the storage portion 209 as information. The task table 401 includes a task number 402 assigned to a corresponding task, an event condition 403 of the event generation portion 202, a signal input condition 404 of the signal input portion 204, a signal processing condition 405 of the CPU 205, an output processing condition 406 of the output portion 206, and a node number 407. In the task table 401 of the node device 104, one or more measurement tasks are registered in advance, in accordance with measurement items and sensors connected to the node device 104. The measurement tasks registered in the task table 401 are executed sequentially in the order from a measurement task whose event condition 403 has been satisfied. The task whose event condition 403 has been satisfied is executed under the signal input condition 404, the signal processing condition 405, and the output processing condition 406.

Figure 5:
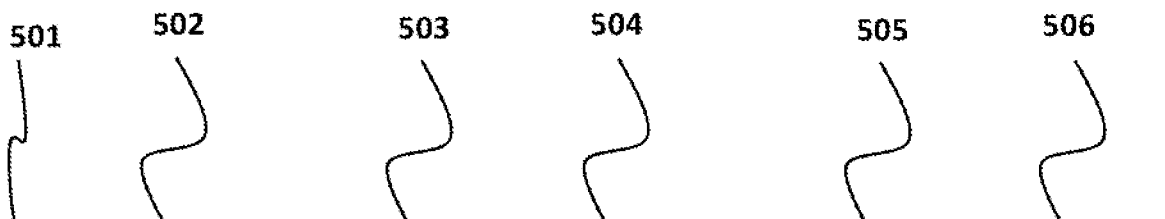
FIG. 5 is an index table of the gateway device of the embodiment.

The table illustrated in FIG. 5 is an index table 501 of the gateway device 105. The gateway device 105 has the index table 501, which is stored in the storage device 305 as information. The index table 501 includes a node number 502 of the node device 104, a task number 503 that indicates a number assigned to a corresponding task of the node device 104 registered in the task table 401, a receiving means 505, a database name 504 indicating a data storage device where data is to be stored, and a table name 506 that defines an area of the database where the data is to be stored. The index table 501 is registered in advance, associated with the node device 104 connected to the gateway device 105 and with the task table 401 of the node device 104. Upon receiving measurement data from the node device 104, the gateway device 105 searches the index table 501 for a node number 502 and a task number 503 included in the received measurement data. The gateway device 105 then registers the measurement data by using the information on the database name 504 and the table name 506 corresponding to the node number 502 and the task number 503 of the index table 501.

Figure 6:
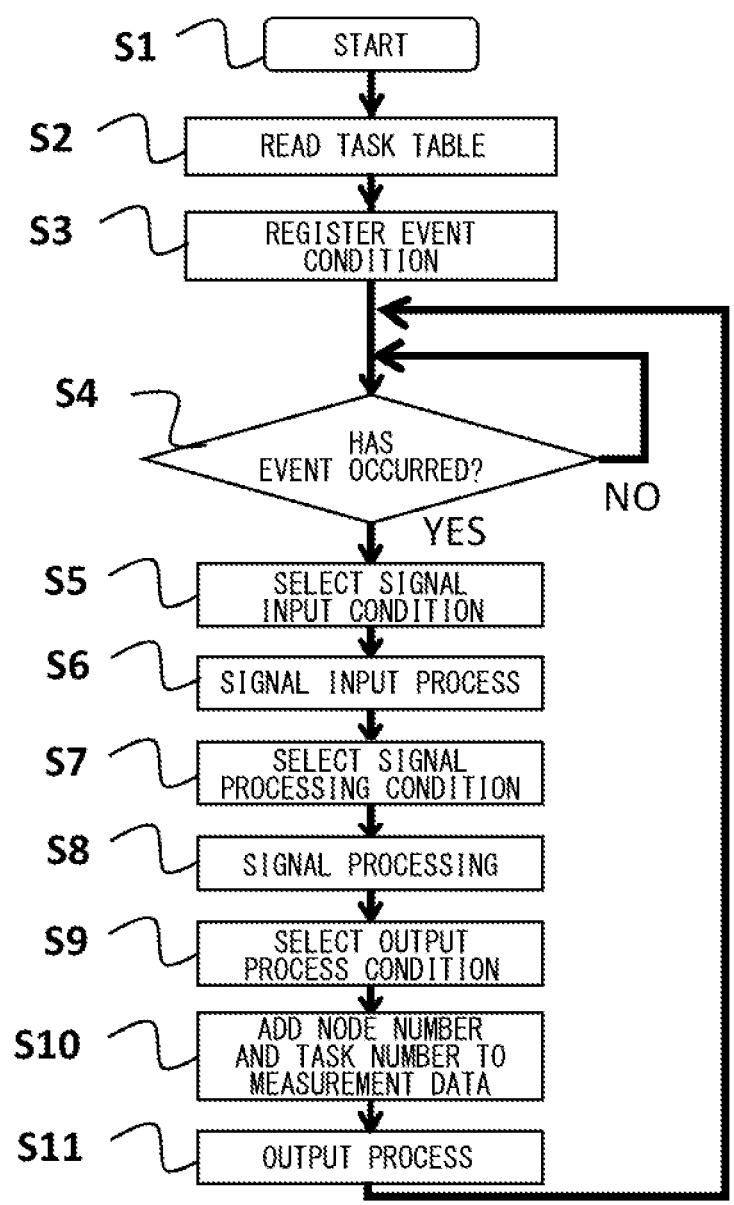
FIG. 6 is a flowchart illustrating an operating procedure of the node device of the embodiment.

FIG. 6 is a flowchart of processes in which the node device 104 obtains the state of the production facility 101. The following description will be made for processes in which the state of the production facility 101 is obtained by using the task table.

In Step S1, the CPU 205 of the node device 104 starts to obtain the state of the production facility 101. In Step S2, the CPU 205 reads tasks that have been registered in advance, from the task table 401 of the storage portion 209.

In Step S3, the CPU 205 resisters an event condition 403 of each task, which is registered in the task table 401, in the event generation portion 202.

In Step S4, the CPU 205 of the node device 104 refers to the event registered in Step S3, and checks whether an event, such as a specified time, a specified interval, or an external input, has occurred.

If an event has occurred, then the CPU 205 executes a task corresponding to the event. In Step S5, the CPU 205 sets the signal input portion 204 by selecting a signal input condition 404 including a physical-quantity input channel, a sampling frequency, an input range, the number of samples, and an amplification factor, which are registered in the task table 401.

In Step S6, the CPU 205 performs a signal input process, such as analog-digital conversion, under the signal input condition 404 that has been set. In Step S7, the CPU 205 selects a signal processing condition 405 registered in the task table 401, and performs the setting of the CPU 205. In Step S8, the CPU 205 performs signal processing on the digitalized measurement data. In Step S9, for handling the signal-processed measurement data, the CPU 205 sets the output portion 206 under an output processing condition 406 registered in the task table 401.

In Step S10, the CPU 205 adds a node number 407 of the node device 104 and a task number 402 corresponding to the event, to the measurement data. Note that if the output condition (output destination) is the storage device, only the task number may be added to the measurement data because the node number is known. In Step S11, the measurement data to which the node number and the measurement task number have been added is outputted to the gateway device, the general-purpose input/output portion of the output portion 206, or the storage device of the output portion 206, under the output processing condition 406. When Step S11 is completed, the CPU 205 returns to Step S4, and checks whether an event has occurred again.

Figure 7:
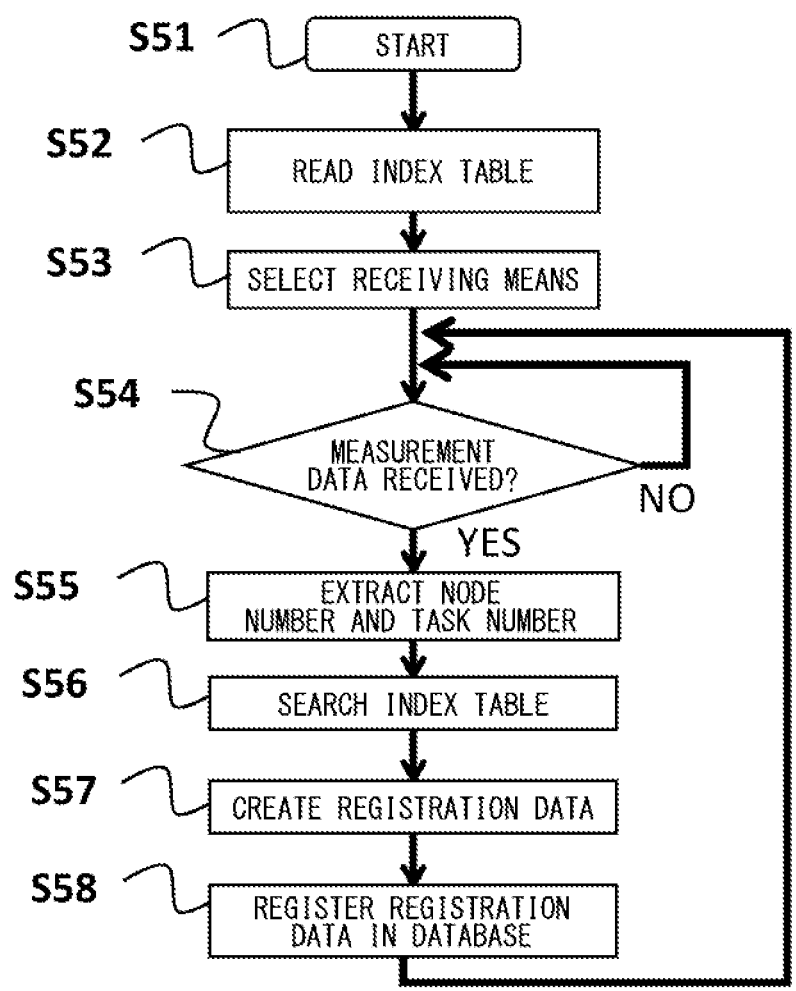
FIG. 7 is a flowchart illustrating an operating procedure of the gateway device of the embodiment.

FIG. 7 is a flowchart for illustrating a procedure in which the gateway device 105 collects and processes measurement data for obtaining the state of the production facility. The following description will be made for a procedure in which the gateway device 105 registers the measurement data sent from the node device 104, in a database for obtaining the state of the production facility.

In Step S51, the CPU 308 of the gateway device 105 starts to obtain the state of the production facility 101. In Step S52, the CPU 308 reads the index table 501 that has been registered in advance in the storage device 305.

In Step S53, the CPU 308 of the gateway device 105 selects a receiving unit to receive measurement data from the node device 104, depending on a receiving means 505 registered in the index table 501. If a plurality of receiving means are registered in the index table 501, the gateway device 105 selects a plurality of receiving units.

In Step S54, the CPU 308 of the gateway device 105 checks whether one receiving unit has received measurement data from the node device 104. If the receiving unit receives measurement data from the node device 104, then the gateway device 105 proceeds to Step S55, and extracts a node number of the node device and a task number from the measurement data.

In Step S56, the CPU 308 searches the index table 501 for indexes by using the node number and the task number. Then the CPU 308 determines a table of a database where the measurement data is to be stored, depending on the indexes that the CPU 308 has found. In Step S57, the CPU 308 creates a query to store the measurement data. In Step S58, the CPU 308 of the gateway device 105 executes the query and stores the measurement data in the table of the database. When Step S58 is completed, the CPU 308 returns to Step S54, and checks whether the receiving unit has received measurement data again.

In the present embodiment, since the communication is performed efficiently, the gateway device can easily determine, even in a limited communication band, that one piece of measurement data has been sent from which node device, or measured in which measurement task. In addition, since the communication is performed efficiently, the power consumption of the node device can be reduced.

Next, some specific examples will be described. In a first example, measurement is performed depending on a recipe, and the measurement result is stored in a data storage device. In a second example, in an abnormal state, measurement is performed depending on another recipe. In a third example, in an abnormal state, measurement is performed by another node device, depending on a recipe of the other node device. In a fourth example, if the gateway device receives measurement data from a node device that is not registered in the index table, the gateway device stores the measurement data in a database, as test data.

First Example

The first example of the present embodiment will be described with reference to the accompanying drawings. FIG. 1 is a schematic diagram of a production facility that includes an information processing system of the first example.

A pump serves as the production facility 101, and includes vibration sensors 102 and 103 for obtaining the operation state. The vibration sensors 102 and 103 convert the strength of vibration to a voltage signal, as a physical quantity. The vibration sensors 102 and 103 are connected to a node device 104, and obtain the state of the pump, which serves as the production facility 101. The node device 104 includes communication units 109, which allow the node device 104 to communicate with the gateway device 105. For example, the node device 104 includes an LPWA (low power wide area) wireless-communication unit.

The node device 104 performs measurement, depending on a task table 401 stored in advance in a storage portion 209. Specifically, the node device 104 performs measurement under an event condition 403, which is set in the task table 401 of FIG. 4.

In a task 1 in which a task number 402 is 1, since the event condition 403 is set so that events occur at intervals of 60 minutes, the task 1 is executed once every 60 minutes. Specifically, the elapsed time is reset when the power of the node device 104 is turned on, and the task 1 is executed every time 60 minutes has elapsed. When the task 1 is executed, the analog-digital conversion is performed under a signal input condition 404: an analog-digital conversion channel of 1; a sampling frequency of 54 kHz; an input range from 0 to 5 V; the number of samples of 10,000; and an amplification factor of 50. In the task 1, after the analog-digital conversion, the CPU 205 performs the FFT process and then the partial overall process under a signal processing condition 405. Since wireless communication is selected under an output processing condition 406 for the task 1, the CPU 205 adds the number of the node device 104 and the task number of 1 to the measurement data, and sends the measurement data to the gateway device 105 via a wireless-communication unit 207.

In a task 2 in which a task number 402 is 2, the task 2 is executed at 15:00 on every Monday, under an event condition 403. When the task 2 is executed, the analog-digital conversion is performed under a signal input condition 404: an analog-digital conversion channel of 2; a sampling frequency of 54 kHz: an input range from 0 to 5 V; the number of samples of 10,000; and an amplification factor of 50. In the measurement task 2, after the analog-digital conversion, the CPU 205 performs the FFT process under a signal processing condition 405. Since wire communication is selected under an output processing condition 406 for the measurement task 2, the CPU 205 adds the number of the node device 104 and the task number of 2 to the measurement data, and sends the measurement data to the gateway device 105 via a wire-communication unit 208.

The gateway device 105 receives measurement data, to which the node number 104 and the task number 1 have been added, from the node device 104 via the wireless-communication unit 302 every time the task 1 is executed at an interval of 60 minutes. The gateway device 105 extracts the number of the node device 104 and the task number of 1 from the measurement data, and searches the index table 501 (FIG. 5) of the storage device 305.

If the node number is 104 and the task number is 1, the gateway device 105 finds a database name 504 of DB1 and a table name 506 of TBL3, which have been registered in advance in the index table 501. The gateway device 105 creates a query to store the measurement data in the table TBL3 of the database DB1, and stores the measurement data in the table TBL3 of the database 107 (DB1), via the in-plant network 307.

Similarly, when the measurement task 2 is executed at 15:00 on every Monday, the gateway device 105 receives measurement data, to which the node number 104 and the task number 2 have been added, from the node device 104 via the wire-communication unit 304. The gateway device 105 creates a query to store the measurement data in a table TBL4 of the database 107 (DB1), and stores the measurement data in the table TBL4 of the database 107 (DB1), via the in-plant network 307.

The node device 104 has a plurality of measurement tasks. Thus, if the gateway device receives only the measurement data, the gateway device cannot distinguish the measurement task from the other measurement tasks. Consequently, the gateway device cannot store the measurement data in a corresponding table of a corresponding database specified for the measurement task. In addition, if the node device 104 specifies a database and a table for storing measurement data, the amount of send data will increase, possibly shortening the battery life of the node device and making it difficult for the communication band to accommodate the send data.

In the present example, since the node number and the task number are added to the measurement data by the node device, the battery life of the node device can be secured, and each measurement data can be identified by the gateway device. In addition, the present example can provide a measuring means that can set a plurality of measurement conditions.

Second Example

Figure 8:
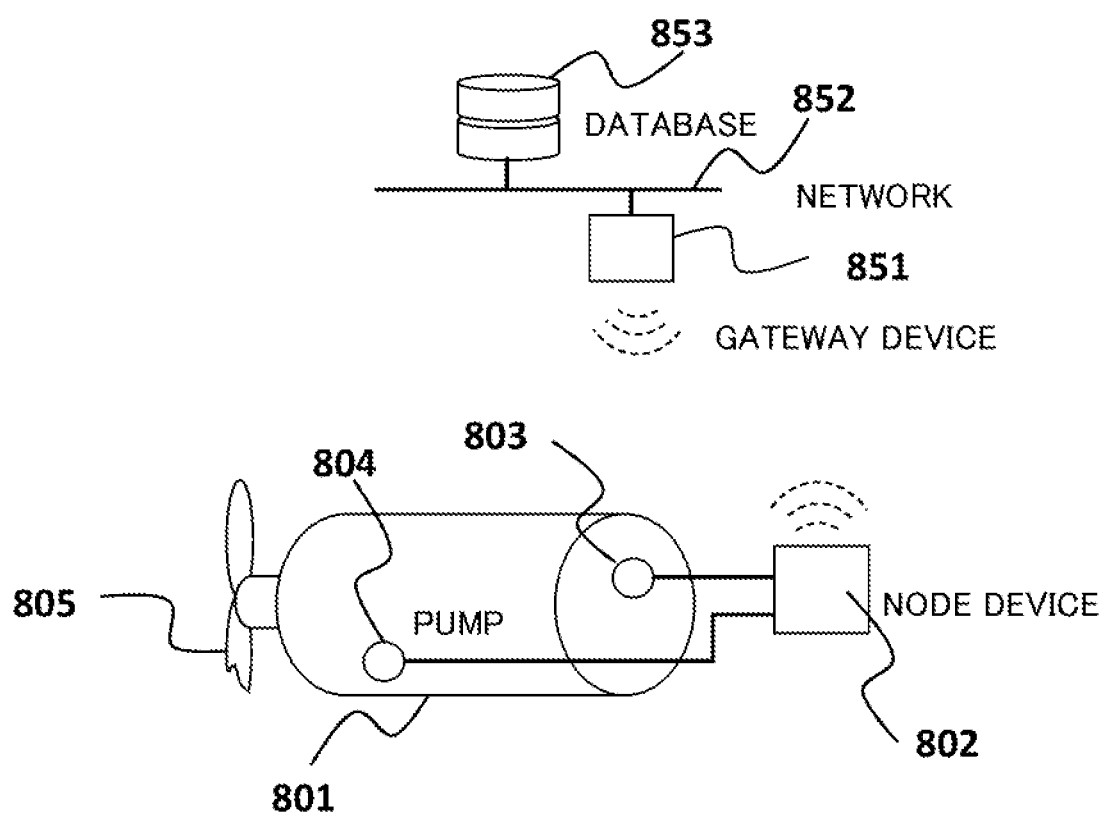
FIG. 8 is a schematic diagram of an information processing system of a second example.

The second example of the present embodiment will be described with reference to the accompanying drawings. FIG. 8 is a schematic diagram of an information processing system. The following description will be made for a procedure in which detailed measurement is performed when a blade of a pump of a production facility is damaged for example and abnormal vibration is occurring.

For obtaining the operation state of a pump 801, a channel 1 of a node device 802 is connected to a vibration sensor 803, and a channel 2 of the node device 802 is connected to a temperature sensor 804. In a task table of the node device 802, a measurement task 1, a measurement task 2, and a measurement task 3 have been registered in advance.

Figure 9:
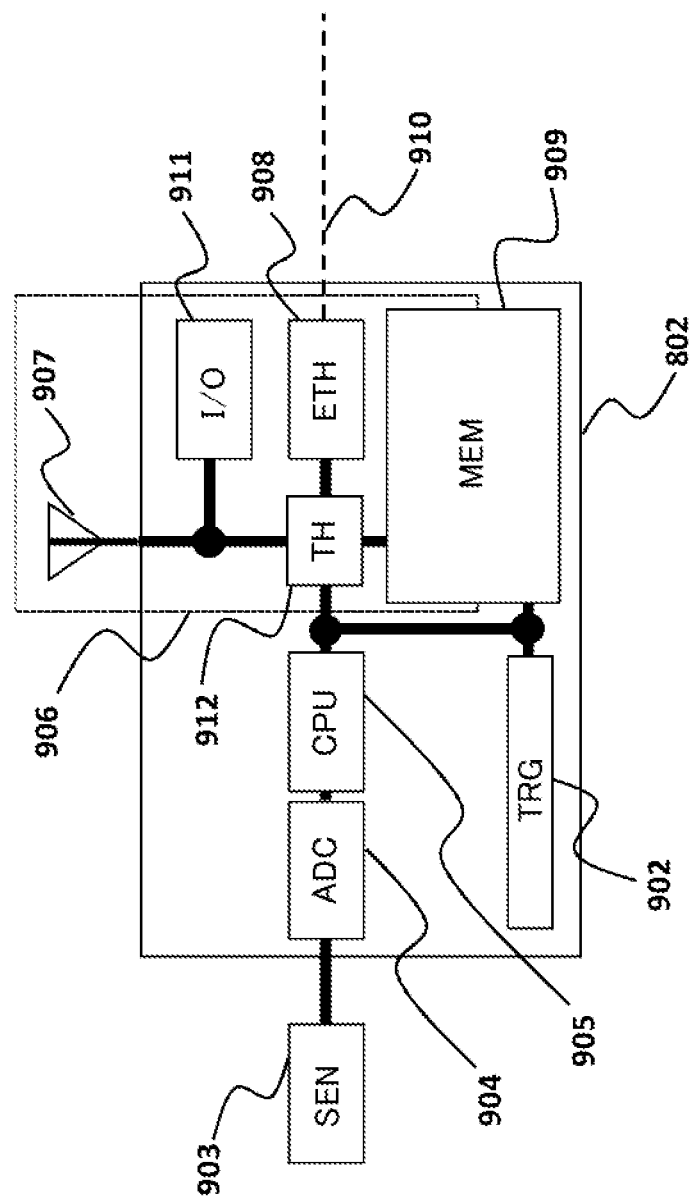
FIG. 9 is a block configuration diagram of a node device of the second example.

FIG. 9 illustrates a block configuration diagram of the node device, and FIG. 10 illustrates a task table 1001 of the node device.

A node device 802 is connected to the vibration sensor 803 and the temperature sensor 804, which are illustrated in FIG. 9 as a sensor 903. The node device 802 includes a signal input portion 904, which converts an analog signal outputted from the sensor 903, to a digital signal. That is, the signal input portion 904 converts an analog input signal to a digital signal. Note that the signal input portion 904 may be included in the sensor 903.

The signal digitized by the signal input portion 904 is processed by a CPU 905. The CPU 905 selects one or more of the following processes: no-operation process, FFT process, partial overall process, envelop process, frequency filter process, differential process, integral process, wavelet process, average value process, standard deviation process, maximum value process, minimum value process, peak-to-peak process, peak hold process, effective value process, crest factor process, form factor process, impulse coefficient process, margin coefficient process, and machine-learning-model inference process, and determines the order of the selected processes.

The node device 802 includes an output portion 906 that outputs a signal processed by the CPU 905. The output portion 906 includes a threshold determination portion 912, which selects an output destination depending on a result of a process performed by the CPU 905. In addition, the output portion 906 includes at least one of a wireless-communication unit 907 and a wire-communication unit 908. Under the control of the CPU 905, the output portion 906 selects at least one of the wireless-communication unit 907, the wire-communication unit 908, a storage portion 909, and a general-purpose input/output portion 911, as an output destination. The CPU 905 associates a result of a process performed by the CPU 905, with a node number 1007 and a task number 1002 (FIG. 10), and outputs the result as measurement data. The node number 1007 is a number to identify the node device 802 as an individual device.

The wire-communication unit 908 is connected to a gateway device 851 via a sensor network 910. The node device 802 includes an event generation portion 902 that is activated at diagnosis intervals or a diagnosis time, which is predetermined as a timer trigger, or is activated by a trigger inputted via the general-purpose input/output portion 911.

The event condition of the event generation portion 902 is stored, as a component of a measurement task, in a task table of the storage portion 909, together with the signal input condition of the signal input portion 904, the signal processing condition of the CPU 905, and the output condition of the output portion 906. Note that although the task table is stored in the storage portion 909, the task table may be stored in another storage device.

A task 1 is executed under an event condition 1003, once every 60 minutes. When the task 1 is executed, the analog-digital conversion is performed under a signal input condition 1004: an analog-digital conversion channel of 1; a sampling frequency of 54 kHz; an input range from 0 to 5 V; the number of samples of 10,000; and an amplification factor of 50. In the task 1, after the analog-digital conversion, the CPU 905 performs the frequency filter process and then the average value process under a signal processing condition 1005. In the task 1, wireless communication and conditional measurement tasks 2 and 3 are selected under an output condition 1006. The CPU 905 adds the node number 802 and the task number 1 to the measurement data, and sends the measurement data to a gateway device 851 via the wireless-communication unit 907. The gateway device 851 registers the measurement data, to which the node number 1007 (802) and the task number 1002 (1) have been added, in a database 853 via a network 852.

For example, if a blade 805 of the pump 801 is damaged and abnormal vibration is occurring, an average value of measurement data in the task 1 exceeds 50.0 m/s$^2$, and the threshold determination portion 912 of the output portion 906 determines that the average value has exceeded the threshold (a predetermined condition has been satisfied). Then, the node device sends the measurement data to the gateway device 851, and executes the measurement tasks 2 and 3. The node device 802 then sends the result of the measurement tasks 2 and 3, to the gateway device 851 under an output condition 1006.

In the task 2, detailed measurement is performed by using the vibration sensor. In the measurement task 2, the analog-digital conversion is performed under a signal input condition 1004: an analog-digital conversion channel of 1; a sampling frequency of 54 kHz; an input range from 0 to 5 V; the number of samples of 10,000; and an amplification factor of 50. In the measurement task 2, after the analog-digital conversion, the CPU 905 performs the FFT process under a signal processing condition 1005. Since wireless communication is selected under an output condition 1006, the CPU 905 adds the node number 802 and the task number 2 to the measurement data, and sends the measurement data to the gateway device 851 via the wireless-communication unit. The gateway device 851 registers the measurement data, to which the node number 1007 (802) and the task number 1002 (2) have been added, in the database 853 via the network 852.

In the measurement task 3, measurement is performed by using the temperature sensor. In the measurement task 3, the analog-digital conversion is performed under a signal input condition 1004: an analog-digital conversion channel of 2; a sampling frequency of 54 kHz; an input range from 0 to 5 V; the number of samples of 10,000; and an amplification factor of 1. In the measurement task 3, after the analog-digital conversion, the CPU 905 preforms the frequency filter process and then the average value process under a signal processing condition 1005. Since wireless communication is selected under an output condition 1006, the CPU 905 adds the node number 802 and the task number 3 to the measurement data, and sends the measurement data to the gateway device 851 via the wireless-communication unit. The gateway device 851 registers the measurement data, to which the node number 1007 (802) and the task number 1002(3) have been added, in the database 853 via the network 852.

In the present example, the output portion includes the threshold determination portion, which selects an output condition depending on a determination result. Thus, the battery life can be secured, and detailed measurement can be performed in accordance with the result of a task, in a limited communication band.

Third Example

Figure 11:
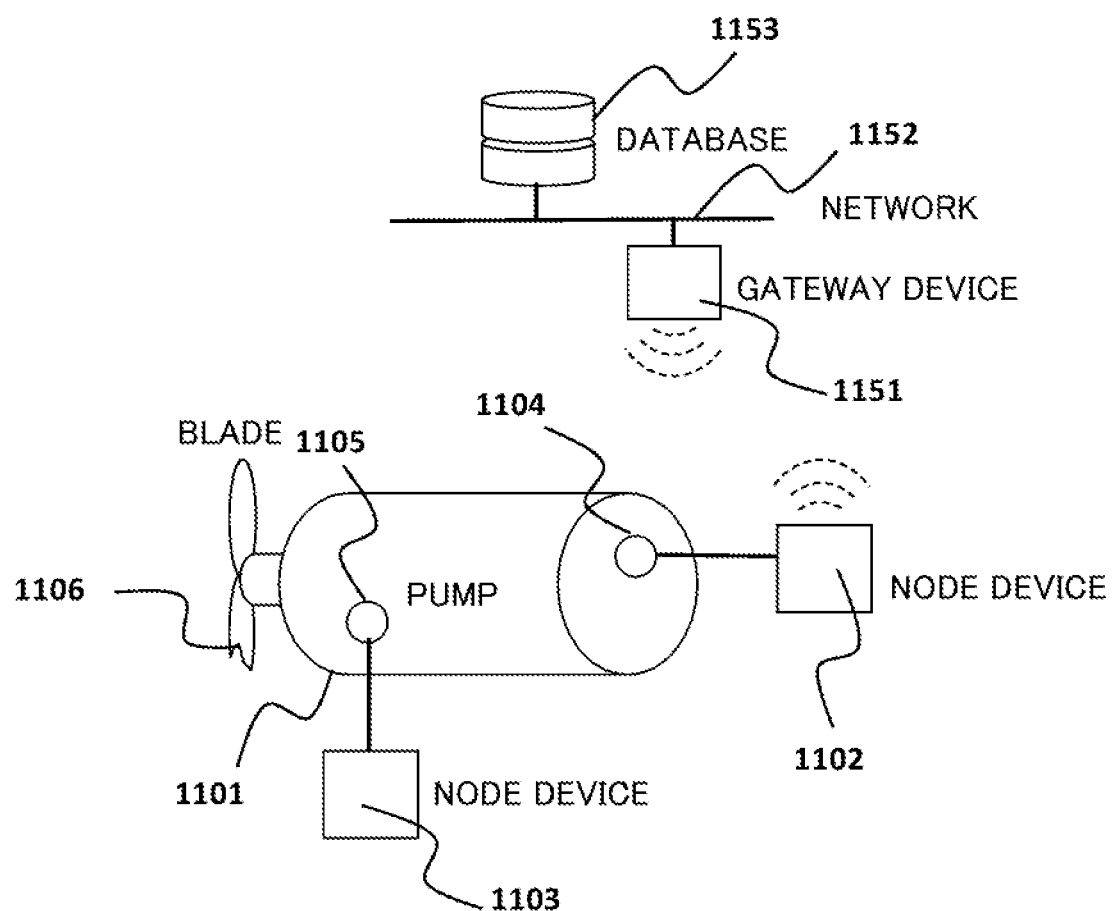
FIG. 11 is a schematic diagram of an information processing system of a third example.

The third example of the present embodiment will be described with reference to the accompanying drawings. FIG. 11 is a schematic diagram of an information processing system. The following description will be made for a procedure in which when a blade of a pump of a production facility is damaged and abnormal vibration is occurring, a task of another node device is called depending on a measurement result of one node device.

Figure 12:
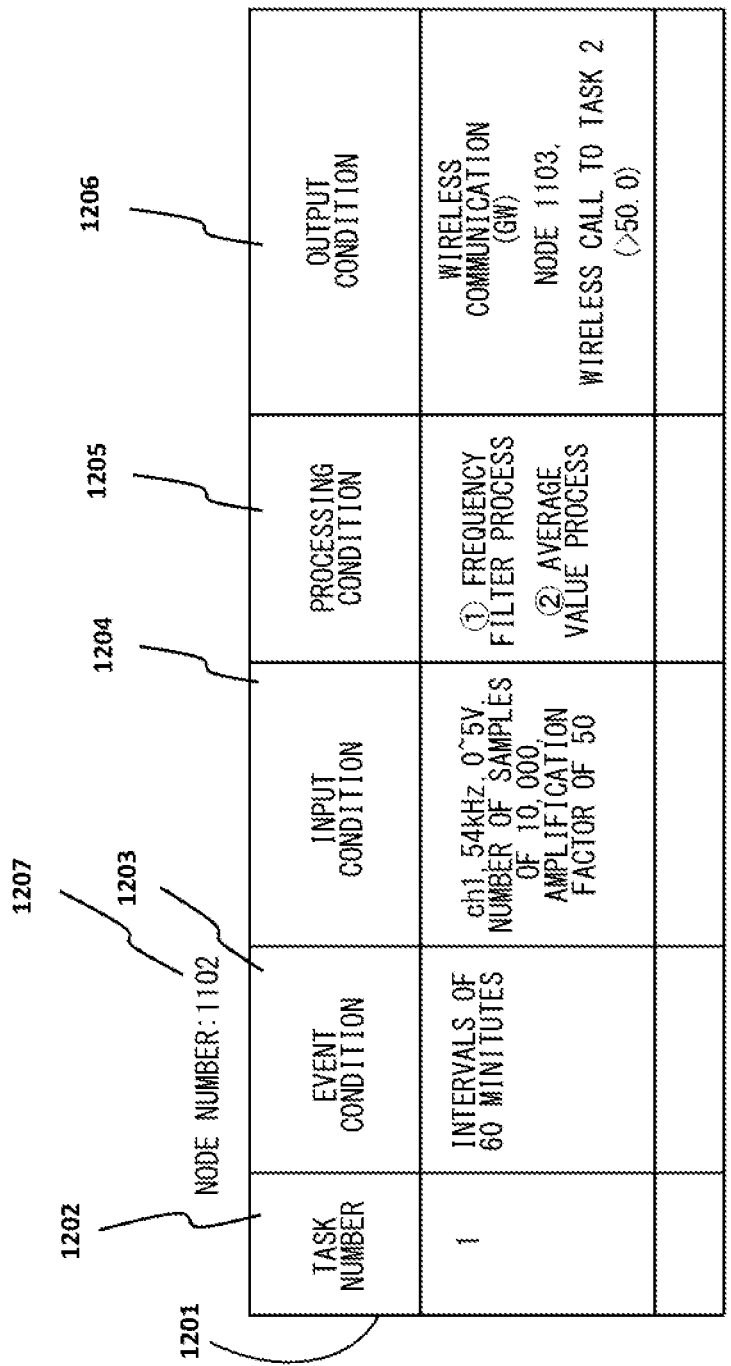
FIG. 12 is a task table of a node device of the third example.

For obtaining the operation state of a pump 1101, a channel 1 of a node device 1102 is connected to a vibration sensor 1104, and a channel 1 of a node device 1103 is connected to a temperature sensor 1105. FIG. 12 illustrates a task table 1201 of the node device 1102. In the task table 1201, a measurement task 1 has been registered in advance. In addition, in a task table 1301 of the node device 1103, a measurement task 1 and a measurement task 2 have been registered in advance. The output portion 906 (FIG. 9) of the node device 1102 includes the threshold determination portion 912.

FIG. 13 illustrates the task table 1301 of the node device 1103. In the task table 1301, the task 1 is set so as to be executed at 15:00 on every Monday under an event condition 1303. In addition, the measurement task 2 is set so as to be executed when called from another node device, under an event condition 1303.

As illustrated in FIG. 12, the task 1 of the node device 1102 is executed under an event condition 1203, once every 60 minutes. When the task 1 is executed, the analog-digital conversion is performed under a signal input condition 1204: an analog-digital conversion channel of 1; a sampling frequency of 54 kHz; an input range from 0 to 5 V; the number of samples of 10,000; and an amplification factor of 50. In the task 1, after the analog-digital conversion, the CPU 905 (FIG. 9) performs the frequency filter process and then the average value process under a signal processing condition 1205.

In the task 1, wireless communication and conditional call to the measurement task 2 of the node device 1103 are selected under an output condition 1206. The CPU 905 adds a node number 1102 and a task number 1 to the measurement data of the task 1, and sends the measurement data from the node device 1102 to a gateway device 1151 via the wireless-communication unit 907. The gateway device 1151 registers the measurement data, to which the node number 1207 (1102) and the task number 1202 (1) have been added, in a database 1153 via a network 1152. In addition, if a condition is satisfied, the node device 1102 calls the measurement task 2 of the node device 1103 via the wireless-communication unit 907, under the output condition 1206.

For example, if a blade 1106 of the pump 1101 is damaged and abnormal vibration is occurring, an average value of measurement data in the task 1 exceeds 50.0 m/s$^2$, and the threshold determination portion 912 of the output portion 906 determines that the average value has exceeded the threshold (a predetermined condition has been satisfied). If the node device 1102 determines that abnormal vibration is occurring, the node device 1102 sends an instruction to the node device 1103 via the wireless-communication unit 907 for causing the node device 1103 to execute the measurement task 2 for immediately measuring the temperature.

Upon receiving the instruction to execute the measurement task 2, from the node device 1102 via the wireless-communication unit 907, the node device 1103 executes the measurement task 2. The node device 1103 is connected to the temperature sensor attached to the pump 1101. When the measurement task 2 is executed, the analog-digital conversion is performed under a signal input condition 1304: an analog-digital conversion channel of 1; a sampling frequency of 54 kHz; an input range from 0 to 5 V; the number of samples of 10,000; and an amplification factor of 1. After the analog-digital conversion, the CPU 905 of the node device 1103 performs the frequency filter process and then the average value process under a signal processing condition 1305. Since wireless communication is selected under an output processing condition 1306, the CPU 905 adds a node number 1103 and a task number 2 to the measurement data, and sends the measurement data to the gateway device 105 via the wireless-communication unit. The gateway device 1151 registers the measurement data, to which the node number 1307 (1103) and the task number 1302 (2) have been added, in the database 1153 via the network 1152.

In the present example, since a call to a task of another node device is set in the output condition, one node device can perform detailed measurement in cooperation with another node device if an error occurs in the pump.

Fourth Example

The fourth example of the present embodiment will be described with reference to the accompanying drawings. The following description will be made for a procedure in which when the gateway device receives measurement data from a node device that has been newly installed in a production facility and that has not been registered in the index table of the gateway device, the gateway device stores the measurement data in a database, as test data, separately from normal measurement data.

Figure 14:
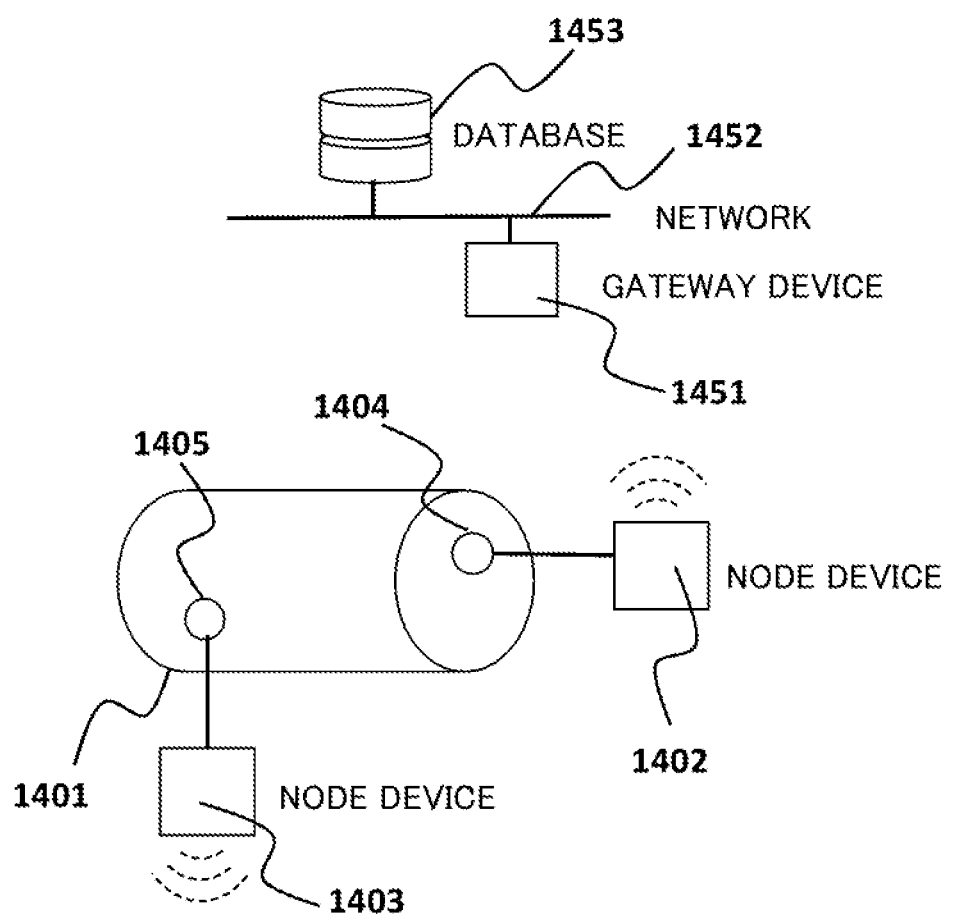
FIG. 14 is a schematic diagram of an information processing system of a fourth example.

FIG. 14 illustrates a schematic diagram of an information processing system of the present example. For obtaining the state of a production facility 1401, a vibration sensor 1404 is disposed in the production facility 1401, and is connected with a node device 1402.

Figure 15:
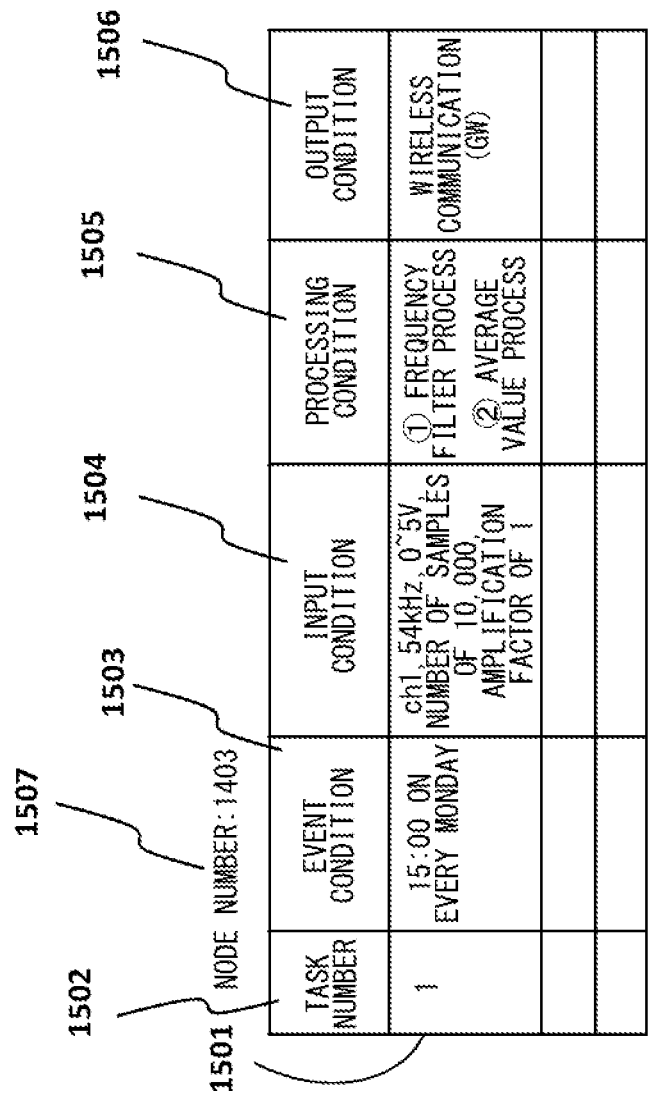
FIG. 15 is a task table of a node device of the fourth example.

For obtaining the detailed state of the production facility 1401, a temperature sensor 1405 has been newly attached to the production facility 1401, and a node device 1403 has been newly installed. FIG. 15 illustrates a task table 1501 of the newly installed node device 1403. In the task table 1501, a task 1 has been registered in advance. The task 1 is executed under an event condition 1503, at 15:00 on every Monday.

When the task 1 is executed, the analog-digital conversion is performed under a signal input condition 1504: an analog-digital conversion channel of 1; a sampling frequency of 54 kHz; an input range from 0 to 5 V; the number of samples of 10,000; and an amplification factor of 1. In the task 1, after the analog-digital conversion, the CPU of the node device 1403 performs the frequency filter process and then the average value process under a signal processing condition 1505.

As illustrated in FIG. 15, in the task 1, wireless communication is selected under an output condition 1506. The CPU adds a node number 1403 and a task number 1 to the measurement data, and sends the measurement data to a gateway device 1451 via the wireless-communication unit 907.

FIG. 16 illustrates an index table 1601 of the gateway device 1451. In the index table 1601, tasks having node numbers 1602 of 1402 and 1450 have been registered in advance. However, the newly installed node device 1403, illustrated by a dotted line frame in FIG. 16, has not been registered in the index table 1601.

Figure 17:
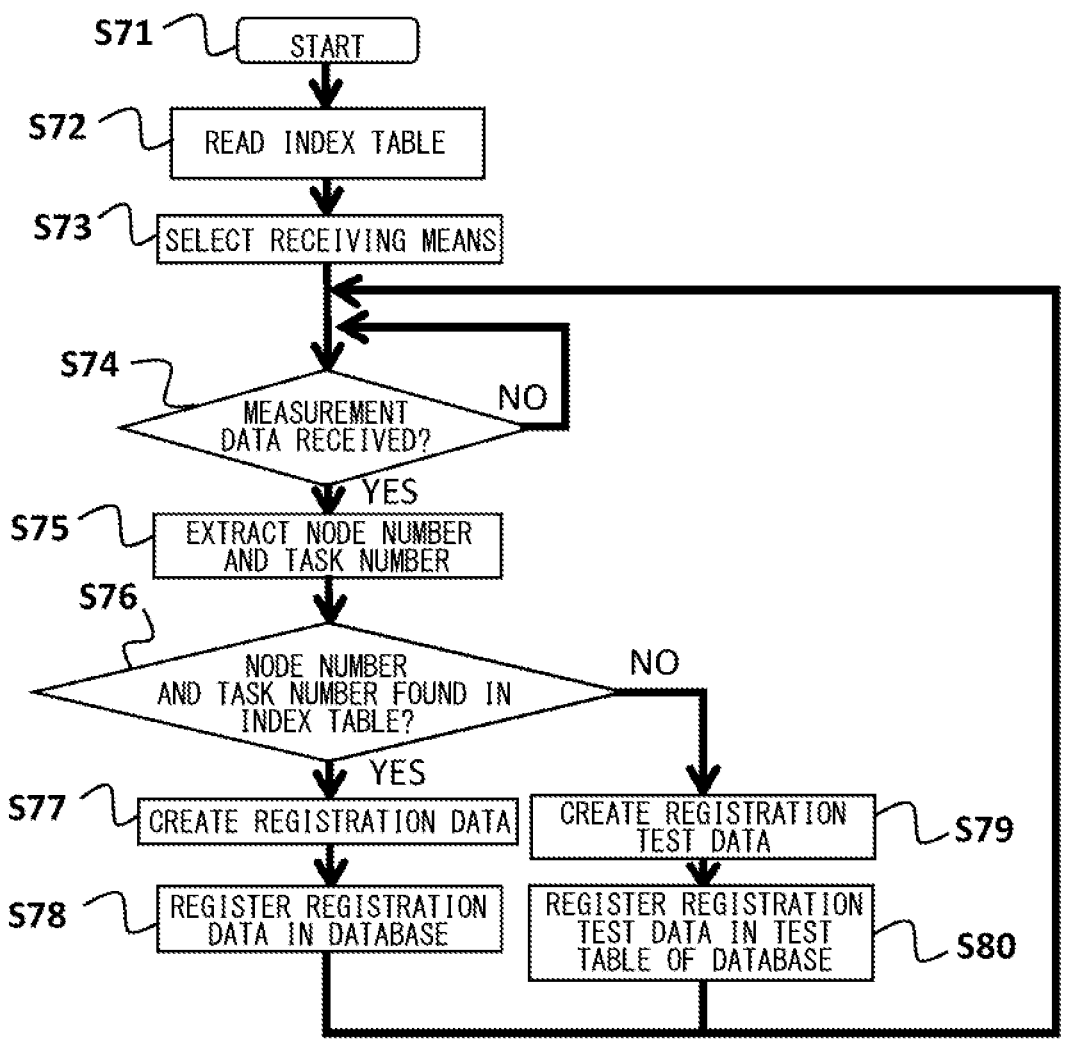
FIG. 17 is a flowchart illustrating an operating procedure of the gateway device of the fourth example.

FIG. 17 is a flowchart illustrating a flow of processes of the present example. In Step S71, the gateway device 1451 starts to obtain the state of the production facility 1401. In Step S72, the gateway device 1451 reads the index table 1601 that has been registered in advance in the storage device 305.

In Step S73, the gateway device 1451 selects a unit to receive measurement data from the node devices 1402, depending on a receiving unit 1605 registered in the index table 1601. If a plurality of receiving units 1605 are registered in the index table 1601, the gateway device 1451 selects the plurality of receiving units 1605.

In Step S74, the gateway device 1451 checks whether one receiving unit 1605 (FIG. 16) has received measurement data from a node device. If the receiving unit 1605, which is registered in the index table 1601, receives measurement data from the node device, the gateway device 1451 proceeds to Step S75, and extracts a node number and a task number from the measurement data sent from the node device.

In Step S76, the gateway device 1451 refers to the node number and the task number, and searches the indexes of the index table 1601. If the gateway device 1451 finds the node number and the task number in the index table 1601, then the gateway device 1451 proceeds to Step S77 and creates a query, and registers the measurement data, in Step S78, in a database 1453 via a network 1452. That is, the gateway device 1451 registers the measurement data, to which the node number 1602 (1402) and the task number 1603 have been added, in a registration destination identified by a database name 1604 and a table name 1606 of the index table 1601.

If the gateway device 1451 receives measurement data from the newly installed node device 1403, the gateway device 1451 cannot find the node number and the task number in Step S76 because they have not been registered in the index table 1601. In this case, the gateway device 1451 proceeds to Step S79, and creates a query for storing the measurement data in a predetermined measurement-test table of the database. In Step S80, the gateway device 1451 stores the test measurement data in the table of the database 1453 via the in-plant network 1452. That is, the gateway device 1451 stores the measurement data, to which the unregistered node number and the unregistered task number 1603 have been added, in the registration destination identified by a database name 1604 and a table name 1606 of the index table 1601.

Note that although the description has been made in the present example for the case where the node number of a node device has not been registered, the measurement data is also handled as test data and registered in the database 1453 if the node number has been registered but the task number has not been registered. That is, the gateway device 1451 registers the measurement data, to which a node number 1602 and an unregistered task number have been added, in a registration destination identified by a database name 1604 and a table name 1606 of the index table 1601.

In the present example, if the gateway device receives measurement data from a node device that has been newly installed in a production facility or measurement data from a task that has been newly installed on an existing node device, and the newly installed node device or the newly installed task has not been registered in the index table of the gateway device, the gateway device stores the measurement data in a database, as test data, separately from normal measurement data. With this operation, it is possible to check whether the newly installed node device is operating normally, and whether the newly installed task is being performed normally. Note that since the term "test data" is used expediently in the above description, any other term may be used as long as the term means the data related to an unregistered node device or an unregistered task.

Modifications

The present invention is not limited to the above-described embodiments and examples, and can be variously modified within the technical concept of the present invention.

The information processing system of the present invention can be used for monitoring the state of not only the production facility but also various machines and facilities, such as industrial robots, service robots, and processing machines that are numerically controlled by a computer. Mechanical equipment and an information processing device may be combined into the information processing system, or the information processing device may be installed as part of the mechanical equipment.

A method that manufactures products by using a production facility while causing the information processing system of the present invention to obtain the state of the production facility is also included in the embodiments of the present invention. A production facility that includes the information processing system of the present invention is also included in the embodiments of the present invention, as a manufacturing system with a high operating ratio.

The above-described information processing system of the embodiment can be embodied as a system that obtains the state of various facilities including a robot which is operated in a production line, and that monitors the facilities. For example, the facilities are mechanical equipments that can automatically perform expansion and contraction, bending and stretching, up-and-down movement, right-and-left movement, pivot, or combined movement thereof, in accordance with information stored in the storage device of the control device.

The above-described information processing method (control method) for obtaining the state of a facility, and a computer-readable recording medium that stores a control program that can execute the information processing method (control method) is also included in the embodiments of the present invention. The recording medium for providing the control program may be a ROM, a disk, or an external storage device. Specifically, the computer-readable non-transitory recording medium may be a flexible disk, an optical disk, a magneto-optical disk, a magnetic tape, a nonvolatile memory such as a USB memory, an SSD, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-50521, filed Mar. 23, 2020, and Japanese Patent Application No. 2020-179431, filed Oct. 27. 2020, which are hereby incorporated by reference herein in their entirety.

What is claimed is:

1. An information processing system comprising:
   at least two node devices, each of the at least two node devices being connected to a sensor configured to measure a state of a facility, and being configured to execute a measurement task; and
   a gateway device configured to communicate with the at least two node devices,
   wherein each of the at least two node devices is configured to add node identification information used to identify the node device and task identification information used to identify an executing condition when executing the measurement task, to measurement data acquired in the measurement task, and send the measurement data to the gateway device.

2. The information processing system according to claim 1, wherein if the gateway device receives the measurement data to which the node identification information and the task identification information have been added, the gateway device stores the measurement data to which the node identification information and the task identification information have been added, in a database.

3. The information processing system according to claim 1, wherein at least one of the at least two node devices is configured to execute another measurement task if a result of one measurement task performed by the at least one of the at least two node devices satisfies a predetermined condition.

4. The information processing system according to claim 1, wherein at least one of the at least two node devices is configured to send an instruction that causes another node device to execute another measurement task, if a result of one measurement task performed by the at least one of the at least two node devices satisfies a predetermined condition.

5. An information processing method that uses an information processing system, the information processing system comprising:
   at least two node devices, each of the at least two node devices being connected to a sensor configured to measure a state of a facility, and being configured to execute a measurement task; and
   a gateway device configured to communicate with the at least two node devices,
   the information processing method comprising:
   adding, by each of the at least two node devices, node identification information used to identify the node device and task identification information used to identify an executing condition when executing the measurement task, to measurement data acquired in the measurement task, and sending the measurement data to the gateway device.

6. The information processing method according to claim 5, wherein if the gateway device receives the measurement data to which the node identification information and the task identification information have been added, the gateway device stores the measurement data to which the node identification information and the task identification information have been added, in a database.

7. The information processing method according to claim 5, further comprising: executing another measurement task by at least one of the at least two node devices, if a result of one measurement task performed by the at least one of the at least two node devices satisfies a predetermined condition.

8. The information processing method according to claim 5, further comprising: sending, by at least one of the at least two node devices, an instruction that causes another node device to execute another measurement task, if a result of one measurement task performed by the at least one of the at least two node devices satisfies a predetermined condition.

9. A computer-readable non-transitory recording medium storing a control program that causes a computer to execute the information processing method according to claim 5.

10. A node device connected to a sensor configured to measure a state of a facility, the node device being configured to execute a measurement task,
    wherein the node device is configured to communicate with a gateway device, and
    wherein the node device is configured to add node identification information used to identify the node device and task identification information used to identify an executing condition when executing the measurement task, to measurement data acquired in the measurement task, and send the measurement data to the gateway device.

11. The node device according to claim 10, wherein the node device is configured to execute another task if a result of one task performed by the node device satisfies a predetermined condition.

12. The node device according to claim 10, wherein the node device is configured to send an instruction that causes another node device to execute another measurement task, if a result of one task performed by the node device satisfies a predetermined condition.

13. A gateway device configured to communicate with at least two node devices, each of the at least two node devices being connected to a sensor configured to measure a state of a facility, and being configured to execute a measurement task,
    wherein if the gateway device receives from any one of the at least two node devices, measurement data to which node identification information used to identify the node device and task identification information used to identify an executing condition when executing the measurement task have been added, the gateway device stores the measurement data to which the node identification information and the task identification information have been added, in a database of an information processing system.

14. A manufacturing system comprising:
    a facility configured to manufacture a product;
    at least two node devices, each of the at least two node devices being connected to a sensor configured to measure a state of the facility, and being configured to execute a measurement task; and
    a gateway device configured to communicate with the at least two node devices, wherein each of the plurality of node devices is configured to add node identification information used to identify the node device and task identification information used to identify an executing condition when executing the measurement task, to measurement data acquired in the measurement task, and send the measurement data to the gateway device.

15. The manufacturing system according to claim 14, wherein if the gateway device receives the measurement data to which the node identification information and the task identification information have been added, the gateway device stores the measurement data to which the node identification information and the task identification information have been added, in a database.

16. The manufacturing system according to claim 14, wherein at least one of the at least two node devices executes another measurement task if a result of one measurement task performed by the at least one of the at least two node devices satisfies a predetermined condition.

17. The manufacturing system according to claim 14, wherein at least one of the at least two node devices sends an instruction that causes another node device to execute another measurement task, if a result of one measurement task performed by the at least one of the at least two node devices satisfies a predetermined condition.

18. A method of manufacturing a product, the method comprising:
using the manufacturing system according to claim 14; and
causing at least one of the at least two node devices to execute a measurement task while causing the facility to manufacture a product.

19. The information processing system according to claim 1, wherein the executing condition includes at least one of an event condition, a signal input condition, a signal processing condition, and an output processing condition, the event condition being a condition for timing to execute the measurement task, the signal input condition being a condition regarding an input of the measurement task, the signal processing condition being a condition for signal processing of the measurement task, the output processing condition being a condition regarding an output of the measurement task.

20. The information processing system according to claim 19, wherein the event condition includes at least one of a predetermined measurement interval, a time, an external-trigger input signal, a change in the state of the node device, a call from another task of the node device, a call from the gateway device, and a call from another node device,
wherein the signal input condition includes at least one of a physical-quantity input channel, a sampling frequency, an input range, the number of samples, and an amplification factor,
wherein the signal processing condition includes at least one of no-operation process, FFT process, partial overall process, envelop process, frequency filter process, differential process, integral process, wavelet process, average value process, standard deviation process, maximum value process, minimum value process, peak-to-peak process, peak hold process, effective value process, crest factor process, form factor process, impulse coefficient process, margin coefficient process, and machine-learning-model inference process, and wherein the output processing condition includes a signal output condition that is a condition related to the output destination of the measurement data.

21. The information processing system according to claim 1, wherein the gateway device has a data for identifying the executing condition based on the task identification information.

22. The information processing system according to claim 1, wherein the task identification information includes a task number.

23. The information processing system according to claim 19, wherein the event condition includes at least two conditions, and wherein the measurement task is started when any one of the at least two conditions is satisfied.

24. The information processing system according to claim 20, wherein the change in the state of the node device includes changing remaining battery level of the node device or changing temperature of the node device.

25. The information processing system according to claim 21, wherein the gateway device is configured to identify the at least two node devices based on the data, and
wherein when the gateway device acquires a node identification information unregistered in the data, the gateway device acquires the measurement data of the node device corresponding to the node identification information unregistered in the data as a test data.

26. The information processing system according to claim 1, wherein the sensor includes at least one of a vibration sensor, an acceleration sensor, a pressure sensor, a photosensor, a torque sensor, and a temperature sensor.

27. The information processing system according to claim 1, wherein the node device is configured to communicate with the gateway device via at least one of low power wide area (LPWA) communication, wireless LAN, and wire communications including the Ethernet and Field Network.

28. A controlling method that uses a node device connected to a sensor configured to measure a state of a facility, the node device being configured to execute a measurement task,
wherein the node device is configured to communicate with a gateway device, and
wherein the node device is configured to add node identification information used to identify the node device and task identification information used to identify executing condition when executing the measurement task, to measurement data acquired in the measurement task, and send the measurement data to the gateway device.

29. A controlling method that uses a gateway device configured to communicate with a at least two node devices, each of the at least two node devices being connected to a sensor configured to measure a state of a facility, and being configured to execute a measurement task,
wherein if the gateway device receives from any one of the at least two node devices, measurement data to which node identification information used to identify the node device and task identification information used to identify executing condition when executing the measurement task have been added, the gateway device stores the measurement data to which the node identification information and the task identification information have been added, in a database of an information processing system.

* * * * *